(12) United States Patent
Ryberg

(10) Patent No.: US 7,810,438 B2
(45) Date of Patent: Oct. 12, 2010

(54) SLOT CHANNEL OVERHEAD STORAGE PLATFORM

(76) Inventor: David L. Ryberg, 28 Branford St., Ladera Ranch, CA (US) 92694

( * ) Notice: Subject to any disclaimer, the term of this patent is extended or adjusted under 35 U.S.C. 154(b) by 701 days.

(21) Appl. No.: 11/125,750

(22) Filed: May 9, 2005

(65) Prior Publication Data

US 2005/0188903 A1    Sep. 1, 2005

Related U.S. Application Data

(60) Provisional application No. 60/667,255, filed on Apr. 1, 2005.

(51) Int. Cl.
    A47B 23/00    (2006.01)
(52) U.S. Cl. .......................... 108/42; 211/113
(58) Field of Classification Search ................ 108/42, 108/48; 211/113, 117, 119
    See application file for complete search history.

(56) References Cited

U.S. PATENT DOCUMENTS

| 3,188,039 | A | * | 6/1965 | Krohn ........................ 248/317 |
| 3,190,604 | A | * | 6/1965 | Jorgensen et al. ........... 248/317 |
| 3,735,951 | A | | 5/1973 | Reed |
| 3,837,609 | A | * | 9/1974 | Weiss et al. ................. 248/317 |
| 3,945,462 | A | | 3/1976 | Griswold |
| 4,441,583 | A | | 4/1984 | Vaught |
| 4,630,423 | A | * | 12/1986 | Lind .......................... 248/317 |
| 5,351,926 | A | * | 10/1994 | Moses ........................ 211/113 |
| 5,737,801 | A | * | 4/1998 | Flood ..................... 248/223.41 |
| 5,749,479 | A | * | 5/1998 | Belokin et al. ............... 211/113 |
| D416,152 | S | * | 11/1999 | Payne et al. .................. D6/513 |
| 6,145,678 | A | | 11/2000 | Morrison |
| 6,161,709 | A | * | 12/2000 | Kluge et al. ................. 211/117 |
| 6,311,626 | B1 | * | 11/2001 | Roberts ........................ 108/42 |
| 6,332,597 | B1 | * | 12/2001 | Korcz et al. .................. 248/343 |
| 6,409,031 | B1 | | 6/2002 | Wynne et al. |
| D459,926 | S | | 7/2002 | Mikich et al. |
| 6,435,105 | B1 | | 8/2002 | Mikich et al. |
| 6,715,427 | B2 | | 4/2004 | Mikich et al. |
| 6,883,513 | B2 | * | 4/2005 | Bock .......................... 211/113 |
| 7,000,783 | B2 | * | 2/2006 | Webb ......................... 211/113 |
| 7,021,476 | B2 | * | 4/2006 | Lloyd et al. .................. 211/113 |
| D525,811 | S | * | 8/2006 | Nawrocki ..................... D6/513 |
| 7,228,669 | B1 | * | 6/2007 | Yaraschefski ............. 52/506.06 |
| 2002/0023888 | A1 | | 2/2002 | Wynne et al. |
| 2004/0182291 | A1 | | 9/2004 | Mikich et al. |

OTHER PUBLICATIONS

Allied Tube and Conduit web page from Internet URL page www.offthefloor.com.

(Continued)

*Primary Examiner*—José V Chen
(74) *Attorney, Agent, or Firm*—Philip H. Haymond

(57) ABSTRACT

An overhead storage platform supported by vertical members that includes slotted support beams supporting the platform deck. The vertical support members are affixed to a ceiling or other overhead structure on one end and to the slotted support beams on the other end with a cradle clamp, where they are adapted to be adjustably moved and affixed within a slot channel in the slotted support beams. The vertical support members can be adjustable in length as well. These two adjustment dimensions allow more adaptability to affixing the platform to overhead supports of varying configurations. Multiple platforms may be abutted to provide a larger and substantially continuous platform deck.

20 Claims, 4 Drawing Sheets

OTHER PUBLICATIONS

Hyloft USA web page from Internet URL page www.hyloftusa.com .

Seo Onrax web page from Internet URL page www.onrax.com.

Unknown Author web pages from Internet URL page www.theuncluttheredgarageh.com/index.html (featuring Tuffxax products).

* cited by examiner

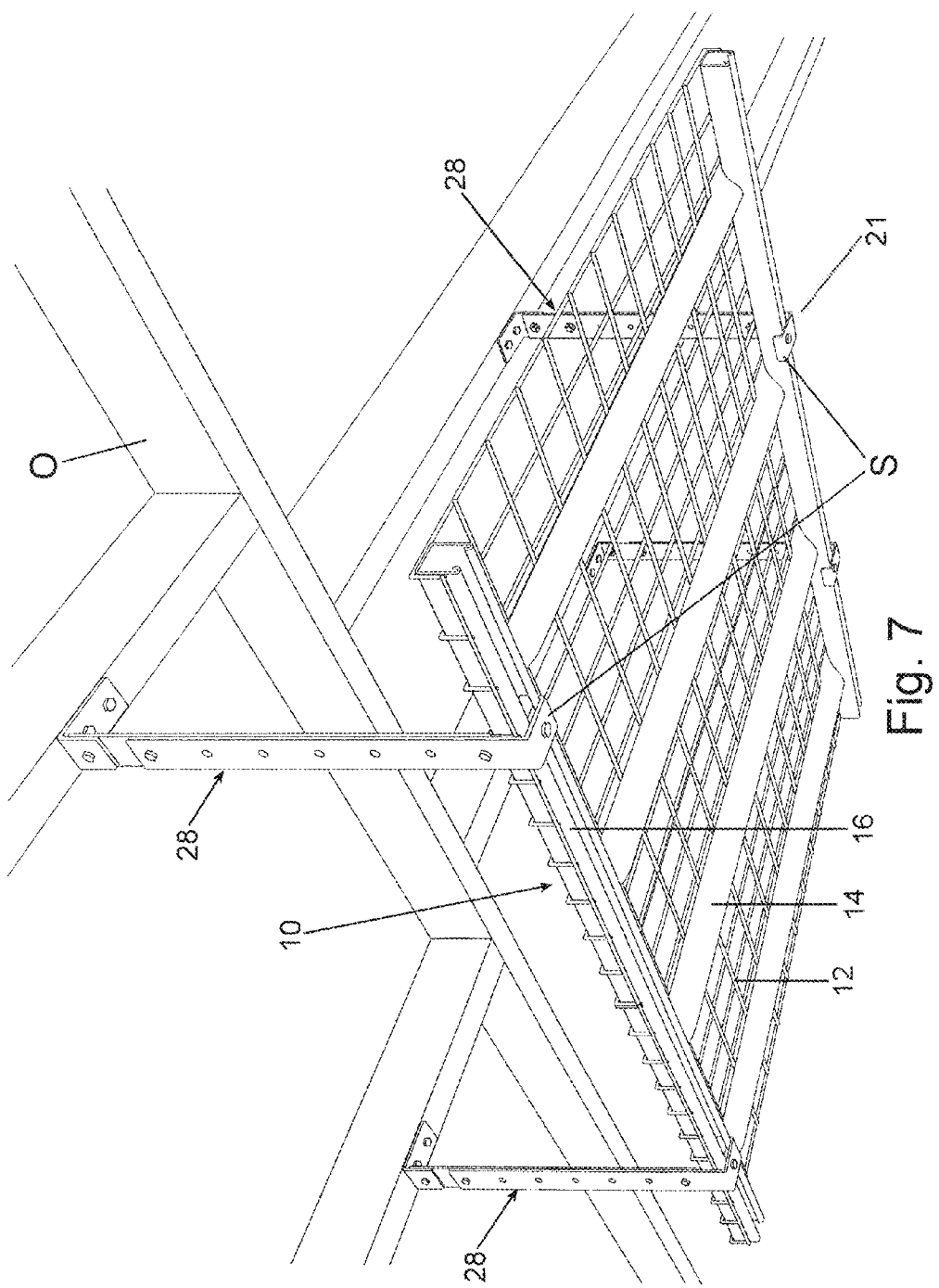

SLOT CHANNEL OVERHEAD STORAGE PLATFORM

RELATED APPLICATIONS

This patent application claims priority to U.S. Provisional Patent Application Ser. No. 60/667,255 filed on Apr. 1, 2005, entitled Slot Channel Overhead Storage Platform.

FIELD OF THE INVENTION

This invention relates to overhead storage racks and more particularly to a method and apparatus for employing a more utilitarian overhead rack.

BACKGROUND OF THE INVENTION

There are many variations in overhead storage platforms, for example platforms that include a deck of manufactured rack that might be used for extra storage in a residential garage or for inventory in a retail establishment. Platforms have been affixed to ceilings or other overhead structures through history. In its most rudimentary form a rack or other deck is simply affixed to separate vertical members extending between the platform and the overhead structure, which in its simplest form this can be made with lumber. Other configurations might include a cradle configuration, with strapping or rope holding a deck aloft. Manufactured overhead platforms have come into wide use that essentially imitate these basic hanging and cradle types of overhead platforms.

The differing utility of various configurations of manufactured overhead storage platforms depends on cost, ease of installation, the ease of enlarging the continuous deck area with additional vertical members and the ability to adapt a given configuration to varying overhead structures, such as wood ceiling joists.

In the past various attempts have been made to improve on one or more of these attributes in manufactured overhead storage. These attempts have been met with varying success.

A simple hanging type of overhead platform, where the deck rests on two or more cross members that are in turn affixed to vertical members attached to an overhead structure, is perhaps the most common type of overhead storage platform. Mikich, U.S. Pat. Nos. 6,435,105 B1 6,715,427 B2 and D459,926 are examples of this simple hanging type of platform. The decks of these Mikich patents are a series of parallel members forming a wire rack assembly. These constructions of Mikich require a complicated arrangement of parts to assemble hanging brackets affixed to variable overhead structures. They use vertical supports affixed to predrilled holes at each end of cross support members that support the deck. The locations of the predrilled holes might not be the optimal position for securing the attached vertical supports to a given ceiling joist or to an irregular overhead structure, therefore one or more Mikich embodiments may include a special adapter, in one embodiment with a cantilever bracket, to affix the vertical support members to an overhead structure.

The Mikich designs however are not optimal to easily allow the affixation of the vertical supports to the horizontal supports from the positions of predrilled holes in the horizontal supports. Instead Mikich resorts to the special adapter atop the vertical supports as a workaround, to transfer the load to an overhead member that might not be conveniently located over a vertical support. These Mikich designs also require so much assembly that they are arguably as difficult to install as essentially assembling an overhead rack from scratch.

Griswold, U.S. Pat. No. 3,945,462 is another example of a simple hanging type of bracket, but Griswold requires an overhead track to allow the vertical member location to be adjusted. Vaught, U.S. Pat. No. 4,441,583 is also a simple hanging type of suspended platform, a scaffolding, but requires a separate overhead grid to adjust the placement of the deck.

Cradle type overhead platforms, where the deck is supported by a continuous U-shaped member that is affixed to a ceiling, are also known in the art. Wynne, U.S. Pat. No. 6,409,031 and patent application publication number 2002/0023888A1, both for Ceiling Mounted Rack and Reed, U.S. Pat. No. 3,735,951, titled Suspended Movable Scaffold, are examples of cradle type racks. Mikich appears to have designed a cradle type of hanging platform in an embodiment found in published U.S. patent application Ser. No. 2004/0182291 A1, and at least a partially cradle type of hanging platform in and U.S. Pat. No. D459,926.

Other patents allow the platform itself to be moved laterally, where the deck can be slid or moved along an overhead track for placement. Reed and Morrison, U.S. Pat. No. 6,145,678, titled Adjustable Suspended Overhead Storage Rack, are examples of such tracked platforms. Morrison is a type of simple hanging rack but otherwise similar to Reed. Because of the track required by both Reed and Morrison they are otherwise complicated and the advantages offered are of limited use for a platform that is to be a fixed long-term storage area for an overhead platform.

What is needed then is a simpler overhead storage platform that can be easily adapted to accommodate varying ceiling and other overhead structures by moving the vertical members. It would also be highly useful to have such a platform that can be enlarged by adding successive platforms to increase the size of the available platform deck used for storage.

SUMMARY OF THE INVENTION

A solution to the above has been devised. An overhead storage platform comprised of a deck supported by a plurality of slot channel beams is provided. Each slot channel beam has a slot channel formed along a length of the slot channel beam and is affixed to an overhead structure with one or more vertical supports. Each vertical support may then be affixed to different areas of the slot of the slot channel beam with a clamping nut fitted within the slot, allowing a selection of different locations to place the vertical supports.

Each vertical support can be affixed anywhere along the length of the slot of the slot channel beam, allowing great adaptability to a given overhead structure in placing the vertical supports. This flexibility allows the vertical supports to be affixed to an irregular overhead structure and provides an easy and efficient apparatus and method for providing an overhead platform. Moreover, in the preferred embodiment the vertical supports are adjustable in length as well, not only allowing adjustment in the length of the vertical supports to accommodate overhead ceilings that are of different height above the platform deck, but also allowing the vertical supports to be affixed to a non-uniform overhead structure at different distances over the length of the platform. Therefore the overhead platform of the present invention can be easily adjusted during installation to adapt to even an overhead structure of ceiling of irregular shape, or to affix the vertical supports to ceiling joists at disparate locations in the ceiling. The present invention then allows the platform to be held at an even elevation with respect to even an irregular ceiling with comparatively little adjustment.

In the preferred embodiment the overhead storage platform deck is a simple wire rack, formed from a series of parallel members or as a grid type of wire rack. The simple wire deck could be a set of parallel members or a grid comprised of a first set of parallel members and second set of parallel members arranged perpendicular to or at another angle to the first set of parallel members. The wire rack rests on traverse support beams that are supported themselves by the slot channel beam. The rigid traverse support beams retain the slot channel beams at a relative distance and may also be used to support the deck along the length of the traverse support beam.

It is envisioned that a suitably rigid and strong platform deck alone could incorporate the function of the traverse support beams, holding the slot channel beams in fixed relation and supporting the deck, eliminating the need for traverse beams altogether.

In a typical configuration of the present invention the storage platform deck would be supported by two slot channel beams, one on each side of the length of the deck. A third or more slot channel beam could be placed between these two slot channels for additional support of the platform deck if need be, the corresponding vertical support passing through the deck for example.

For load stability on the platform and for aesthetic symmetry, a typical configuration of the present invention would be to have four vertical supports supporting each platform. In this embodiment two sets of two vertical supports would be placed in the two slot channel beams opposite each other across the platform, preferably towards the ends of the slot channel beams for better distribution of the weight of a load. The positioning of a vertical support along the slot channel however is independent of the positions of the other vertical supports. Unlike many other platforms of the prior art, Mikich for example, this opposite positioning or pairing of the vertical supports is by no means required, so the vertical supports can be staggered, with opposite vertical members being placed at irregular intervals along the length of the slot channel beams. In this way the vertical supports can be placed where desired along the length of the slot channel beams, rather that at a predetermined place such as with the pre-drilled holes of Mikich.

In the preferred embodiment a vertical support that is adjustable in length is used as well. In one embodiment the vertical supports are adjustable, comprised of three pieces that can be affixed to each other at different locations: a lower half portion is provided that is adapted to be affixed to a slot channel beam with a clamping nut; a ceiling bracket portion that is adapted to be affixed to an overhead structure, and these two portions are joined with a vertical support extender portion. Adjustable vertical support members that are similar to this design are found in the '105, '427, '926 and 291 Mikich patents for example, having vertical supports with portions that may be adjustably overlapped to adjust the length of the vertical support. Such an adjustable vertical support might even be made from two overlapping portions.

The adjustable vertical support of the present invention is meant to encompass any equivalent design, however in the preferred embodiment a three piece design is employed. The vertical support extender portion of the vertical support is adapted to be affixed to the ceiling bracket and also to be affixed to the lower half portion at a selection of locations on the support extender. The support extender has a series of openings that can be pinned or bolted to the ceiling bracket and to the lower half portion, giving the user a selection of lengths for the resulting vertical support.

A series of the overhead storage platforms can be abutted to form a substantially continuous large storage deck. The individual platforms may be connected to each other with a connecting member such as a clamp connecting adjacent decks if desired. In this manner an overhead storage platform is provided that can be easily installed, with the vertical supports being easily adjusted in length and placed along the length of the slot channel beam. The size of the resulting platform deck can therefore be increased as desired by aligning a series of platforms together to form a continuous deck surface.

In this way an overhead storage platform is provided that is much easier to install and customize than those of the prior art.

BRIEF DESCRIPTION OF THE DRAWINGS

FIG. 7 is a perspective view of another embodiment of the invention showing vertical supports affixed to an overhead structure in a staggered configuration.

DETAILED DESCRIPTION OF THE INVENTION

The following description, and the figures to which it refers, are provided for the purpose of describing examples and specific embodiments of the invention only and are not intended to exhaustively describe all possible examples and embodiments of the invention.

Figure 1:
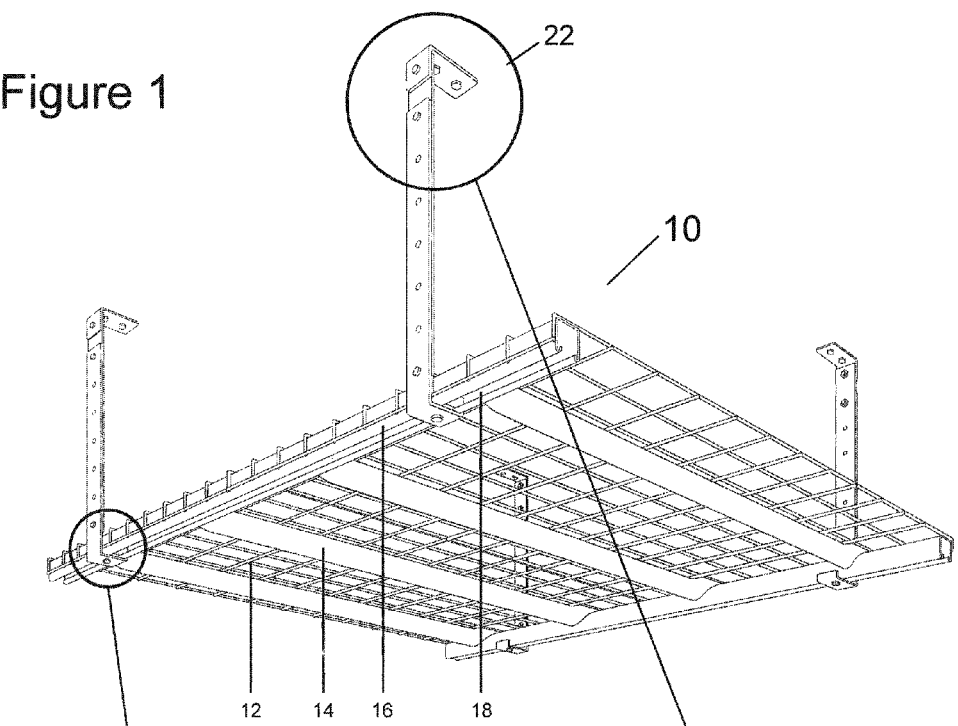
FIG. 1 is front perspective view of an embodiment of the present invention.

Referring now to FIG. 1, a first embodiment of the overhead storage platform 10 of the present invention is shown. A deck 12, here shown as a wire grid, rests upon traverse support beams 14 that hold the slot channel beams 16 apart at a relative fixed distance. The traverse support beams 14 may also be used to support the deck 12 itself.

Figure 2:
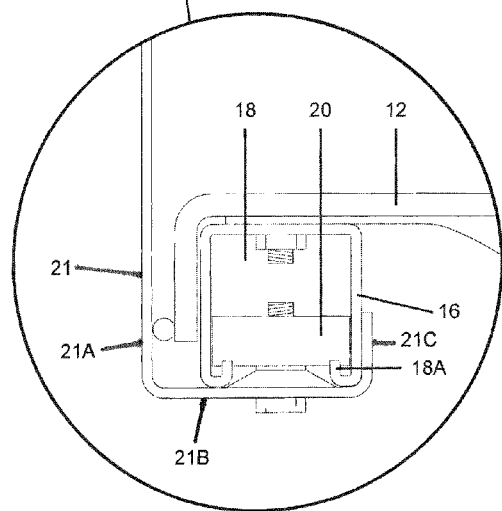
FIG. 2 is a detail view of the slot channel beam and clamping nut of the embodiment of FIG. 1.

Each slot channel beam 16 includes a slot channel 18 formed along the length of the slot channel beam 16. In the preferred embodiment the slot channel beam is formed from a generally U-shaped member having an opening along the entire length of one side of the slot channel beam 16. Referring also to FIG. 2 a detail view of the slot channel of slot channel beam 16 is shown. In the preferred embodiment the U-shaped slot channel 18 also includes side brackets 18A to provide a surface for slot channel clamping nut 20 to be affixed to. A clamping nut 20 may be used to affix the slot channel beam 16 to a vertical support 22. The vertical support may be formed as a cradle clamp 21 adapted to affix to the slot channel beam 16 (also shown in FIGS. 6 and 7). The cradle clamp 21 has three sides to securely support the slot channel beam 16 to prevent lateral movement, comprising a ceiling-mounted vertical support side 21A, an undersupport side 21B and a lateral support side 21C. The three sides 21A, 21B and 21C of the cradle clamp embodiment securely grasp the slot channel beam 16. Metal channel suitable for use as slot channel beam 16 is made by the Thomas & Betts Corporation of Memphis, Tenn., as catalog number Al20020WHC metal framing channel; their product Nylon Cone Nut catalog number CM-100-1/4 is suitable for use as a clamping nut 20.

Figure 3:
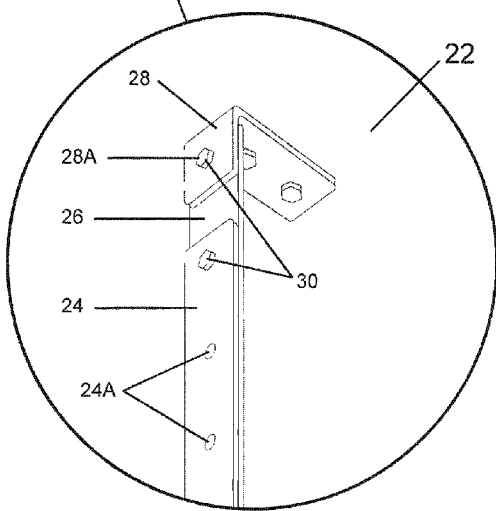
FIG. 3 is a detail view of the vertical support assembly of the embodiment of FIG. 1.

In the preferred embodiment a vertical support 22 is made from a length of flat strap or bar steel. The vertical support 22 may be a single continuous member affixed to the overhead, ceiling or ceiling joist and also affixed to the slot channel beam 16 with a clamping nut 20. Referring further to the detail view of FIG. 3, in the preferred embodiment the vertical support 22 is comprised of a vertical support lower half 24 which has openings 24A at regular intervals. The vertical support 22 is further comprised of a separate portion, a support extender 26, also having openings (not shown) formed at regular intervals and of a ceiling bracket 28, also of strap steel and having an opening 28A. The ceiling bracket 28 is affixed to a ceiling or joist or other overhead member and joined to the lower half of vertical support 24 with a support extender 26. Lower half 24 and ceiling bracket 28 are joined to the support extender 26 with pins or bolts 30 placed through openings 24A, 24A and 28A, through openings selected according to the preference of a user, to complete the vertical support 22. Selecting different openings to join with pins or bolts will vary the resulting effective length of the vertical support 22.

Figure 4:
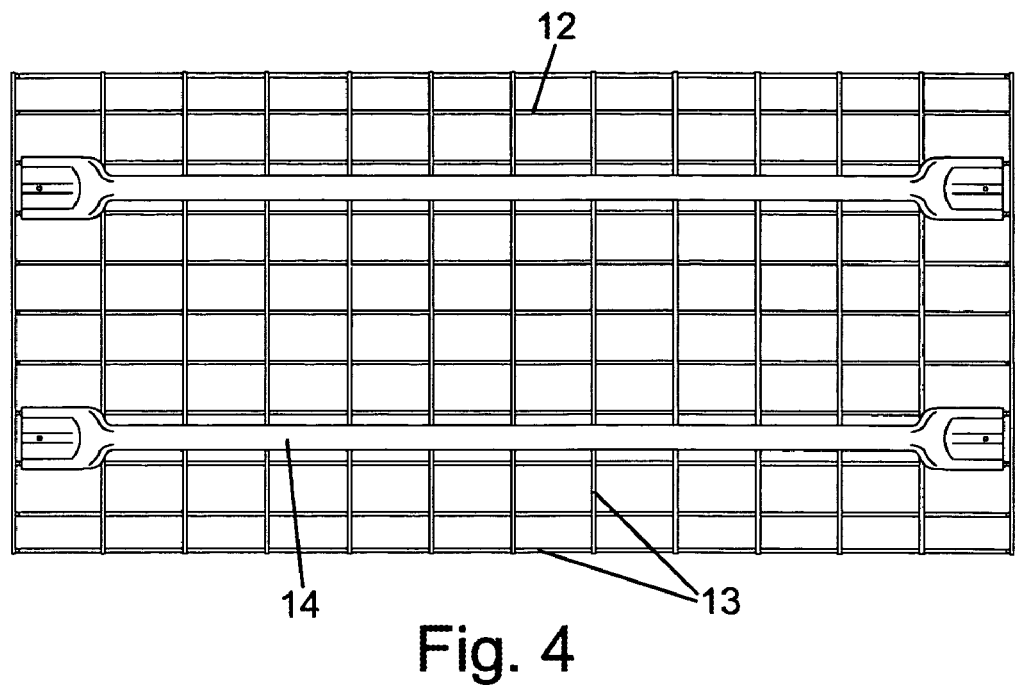
FIG. 4 is plan view of the preferred embodiment of the present invention.

A typical size of the deck of an overhead storage platform is about forty-eight inches square. In the preferred embodiment, shown in FIG. 4, the deck 12 is wire grid 13 about twenty-four inches along the axis in the direction of the slot channel beam (not shown) and forty-eight inches along the direction of the traverse support beam 14. This preferred size makes packaging and handling of the invention easier, while providing a good basic unit of platform deck size to be joined with several units to make a continuous platform.

Figure 5:
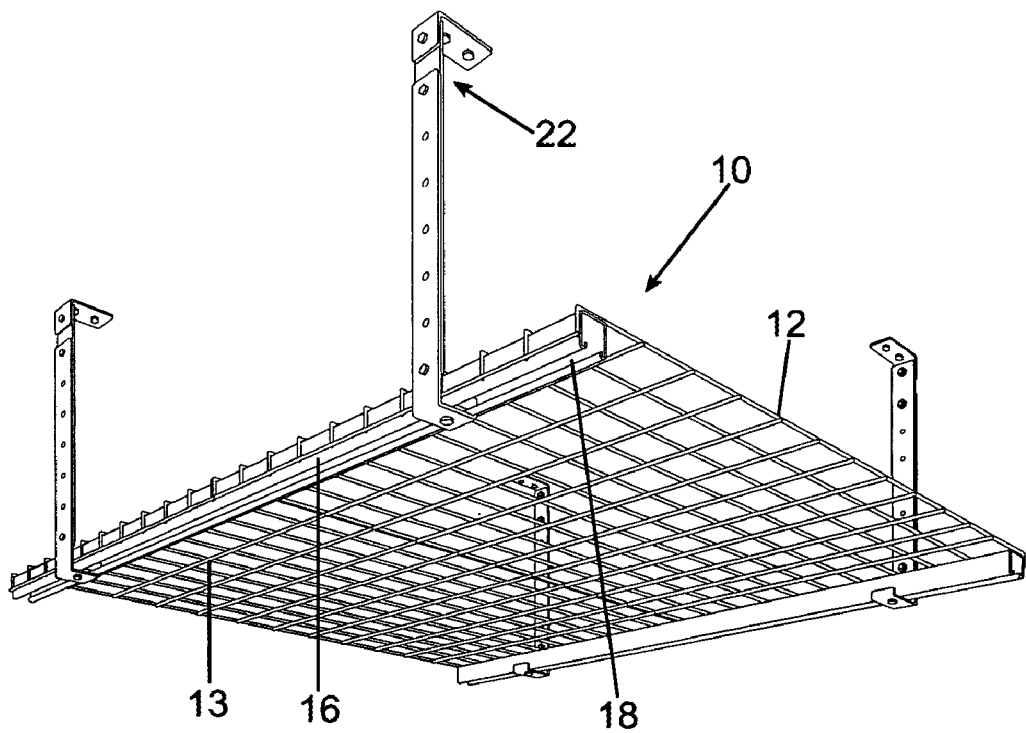
FIG. 5 is a perspective view of another embodiment of the invention, where the deck is rigid and strong enough to eliminate the need for separate traverse support beams.

FIG. 5 shows another embodiment of the present invention. This embodiment is similar to that of FIG. 1, however in this embodiment a deck 12 is used, here a wire grid 13, that is of sufficient strength and rigidity to eliminate the need for the traverse support beams 14 of FIG. 1. It will be apparent to one of skill in the art how to calculate the appropriate type and gauge of a deck for an anticipated load on the platform 13. In this embodiment the deck 13 alone must be of sufficient strength and rigidity to keep the slot channel beams 16 in substantially fixed relative relation while also supporting a given load of stored items. The slot channel beams 16 and vertical supports 22 must also together be strong enough to support the given load.

Figure 6:
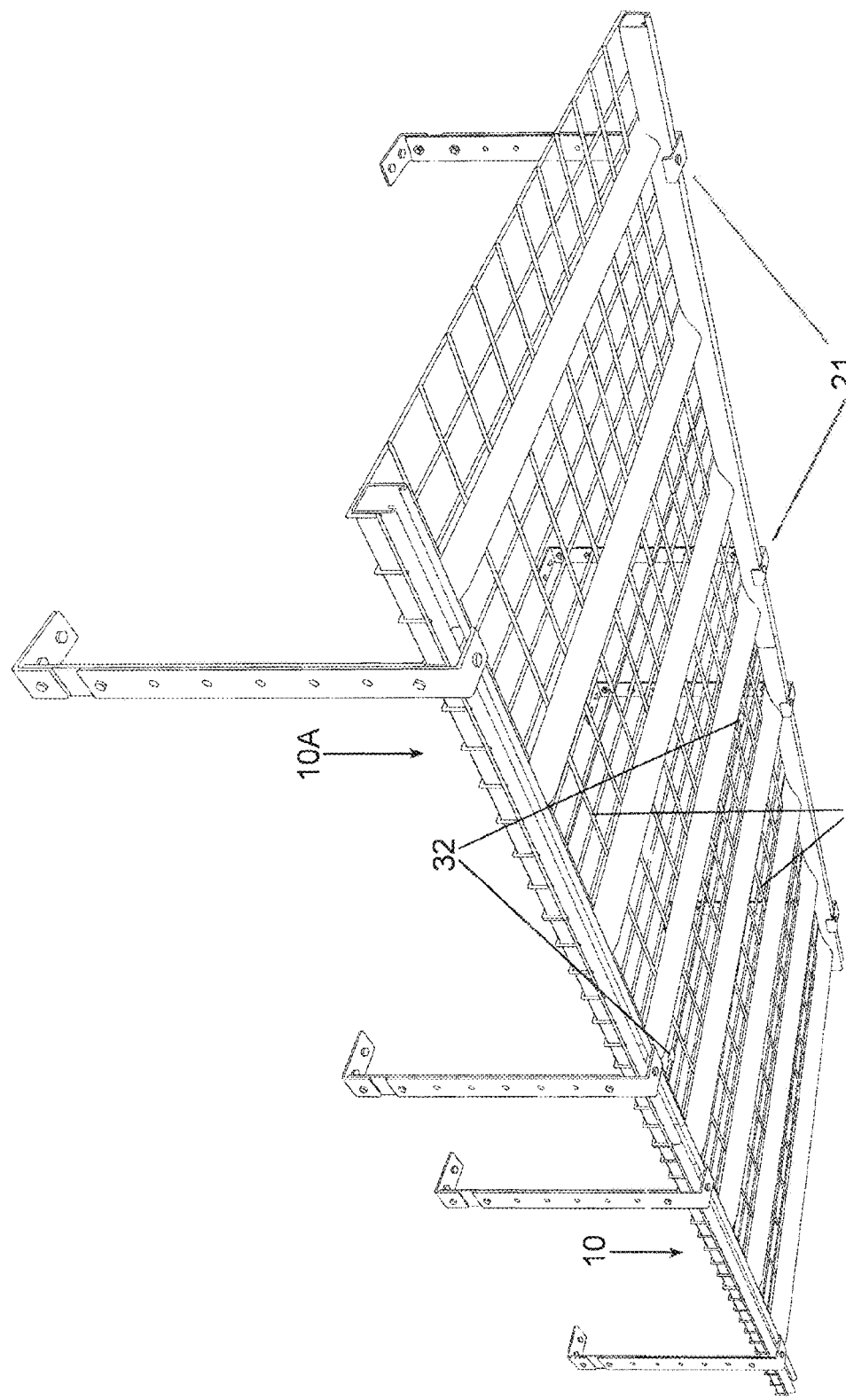
FIG. 6 is a perspective view of another embodiment of the invention, showing a plurality of overhead storage platforms configured together to form a single continuous deck.

FIG. 6 shows an embodiment of the configuration of the present invention having a plurality of abutting overhead storage platforms 10 and 10A. When the decks 12 of platforms 10 and 10A are arranged in this relation the abutting platform decks 12 create a substantially continuous storage surface. Individual platforms may be affixed to the overhead structure individually and placed adjacent, or also affixed to each other. The platforms 10 and 10A may optionally be joined together in fixed relation, shown at 32, for example by clamping them together or with simple ties.

In this manner installation is simplified and particularly adaptable to be used with an overhead structure of varying shape. This configuration also allows a user to create a continuous platform of whatever length is desired by the user.

While vertical supports 22 are typically mounted opposite each other along the length of the support platform (along the direction of the slot channel beam), this is not required. FIG. 7 also shows, at S, that some or all of the vertical supports 22, here shown as 28, may be staggered along the slot channel beams 16 to accommodate an irregularly-shaped overhead structure, designated O. Staggering the vertical supports 22 thusly may also be used to provide additional access to the platform deck 12 by a user between neighboring vertical supports 28. This ability to stagger the vertical supports 22, 28 is of substantial utility, because unlike overhead storage units of the prior art, the vertical members of the storage unit of the present invention may be easily installed along the length of the slot channel beam 16 with a minimum of difficulty, allowing easy attachment and placement of the platform.

It will be appreciated that the invention has been described hereabove with reference to certain examples or preferred embodiments as shown in the drawings. Various additions, deletions, changes and alterations may be made to the above-described embodiments and examples without departing from the intended spirit and scope of this invention.

Accordingly, it is intended that all such additions, deletions, changes and alterations be included within the scope of the following claims.

What is claimed is:

1. An overhead storage platform, comprising:
    a deck, mounted on
    one or more slot channel beams, each slot channel beam having a slot channel formed along a length of the slot channel beam,
    a vertical support adapted to be affixed to an overhead structure and to a slot channel beam with a cradle clamp, where the cradle clamp comprises a vertical support side that is connected to the vertical support, an undersupport side and a lateral support side,
    the slot channel beam is mounted on the undersupport side of the cradle clamp between the vertical support side and the lateral support side, and,
    the slot channel beam is rigidly affixed to the cradle clamp with a clamping nut inserted through the slot channel and a side of the cradle clamp.

2. The overhead storage platform of claim 1 where the deck comprises parallel members or a grid comprised of a set of first parallel members and a second set of parallel members oriented at an angle to the first set of parallel members.

3. The overhead storage platform of claim 1, further including a traverse support beam affixed to at least two slot channel beams.

4. The overhead storage platform of claim 3, having a plurality of support beams and two or more of the support beams are affixed to a first slot channel beam.

5. The overhead storage platform of claim 4, where the two or more traverse support beams are also both affixed to a second slot channel beam on their ends distal the ends affixed to the first slot channel beam.

6. The overhead storage platform of claim 1 where one or more of the vertical supports further comprise a lower half portion that is adapted to be affixed to a slot channel beam with a clamping nut, a ceiling support portion adapted to be affixed to an overhead structure, and a support extender portion adapted to be affixed to both the ceiling support and to the lower half portion, at a range of locations on the support extender, allowing a variation in length of the resulting vertical support.

7. The overhead storage platform of claim 1 where each slot channel beam is affixed to a plurality of vertical supports.

8. The overhead storage platform of claim 7 where the vertical supports affixed to each of two slot channel beams are affixed in pairs that are staggered, positioned so as not to be on substantially opposite sides along the length of the deck.

9. The overhead storage platform of claim 1 further including a second overhead storage platform, and the second overhead platform is abutted to the first to form a substantially continuous deck comprised of the decks of the two overhead storage racks.

10. The overhead storage platform of claim 1 further including a second overhead storage platform, and the second overhead platform is abutted to the first to form a substantially continuous deck comprised of the decks of the two overhead storage racks and the two platforms are attached.

11. A method for providing a overhead storage, comprising the steps of:
   providing a deck
      mounted on one or more slot channel beams, each slot channel beam having a slot channel formed along a length of the slot channel beam,
      a vertical support adapted to be affixed to an overhead structure and to a slot channel beam with a cradle clamp, where the cradle clamp comprises a vertical support side that is connected to the vertical support, an undersupport side and a lateral support side,
      mounting the slot channel beam on the undersupport side of the cradle clamp between the vertical support side and the lateral support side, and,
      affixing the cradle clamp to the slot channel with a clamping nut inserted through the slot channel and a side of the cradle clamp.

12. The method for providing an overhead storage platform of claim 11 where the deck comprises parallel members or a grid comprised of a set of first parallel members and a second set of parallel members oriented at an angle to the first set of parallel members.

13. The method for providing an overhead storage platform of claim 11, where the overhead platform further includes a traverse support beam affixed to at least two slot channel beams.

14. The method for providing an overhead storage platform of claim 13, where the overhead platform has a plurality of support beams and two or more of the support beams are affixed to a first slot channel beam.

15. The method for providing an overhead storage platform of claim 14, where the two or more traverse support beams are also both affixed to a second slot channel beam on their ends distal the ends affixed to the first slot channel beam.

16. The method for providing an overhead storage platform of claim 11 where one or more of the vertical supports further comprise a lower half portion that is adapted to be affixed to a slot channel beam with a clamping nut, a ceiling support portion adapted to be affixed to an overhead structure, and a support extender portion adapted to be affixed to both the ceiling support and to the lower half portion, at a range of locations on the support extender, allowing a variation in length of the resulting vertical support.

17. The method for providing an overhead storage platform of claim 11 where each slot channel beam is affixed to a plurality of vertical supports.

18. The method for providing an overhead storage platform of claim 17 where the vertical supports affixed to each of two slot channel beams are affixed in pairs that are staggered, positioned so as not to be on substantially opposite sides along the length of the deck.

19. The method for providing an overhead storage platform of claim 11 further including a second overhead storage platform, and the step of abutting the second overhead platform to the first to form a substantially continuous deck comprised of the decks of the two overhead storage racks.

20. The method for providing an overhead storage platforms of claim 19 further including the step of attaching the two platforms together.

* * * * *